US010876900B1

(12) United States Patent
Gord et al.

(10) Patent No.: US 10,876,900 B1
(45) Date of Patent: Dec. 29, 2020

(54) SYSTEMS AND METHODS FOR HIGH-SPEED, SPECTROSCOPIC, GAS-PHASE THERMOMETRY

(71) Applicant: Government of the United States, as represented by the Secretary of the Air Force, Wright-Patterson AFB, OH (US)

(72) Inventors: James R. Gord, Beavercreek, OH (US); Sukesh Roy, Dayton, OH (US); Paul S. Hsu, Dayton, OH (US); Naibo Jiang, Dayton, OH (US); Mikhail N. Slipchenko, West Lafayette, IN (US)

( * ) Notice: Subject to any disclaimer, the term of this patent is extended or adjusted under 35 U.S.C. 154(b) by 303 days.

(21) Appl. No.: 16/052,763

(22) Filed: Aug. 2, 2018

(51) Int. Cl.

| | |
|---|---|
| ***G01J 5/60*** | (2006.01) |
| ***H01S 3/102*** | (2006.01) |
| ***G01J 5/00*** | (2006.01) |
| ***G01J 3/44*** | (2006.01) |
| ***H01S 3/10*** | (2006.01) |
| *H01S 3/16* | (2006.01) |

(52) U.S. Cl.
CPC ............ *G01J 5/601* (2013.01); *G01J 3/4412* (2013.01); *G01J 5/0014* (2013.01); *H01S 3/10007* (2013.01); *H01S 3/1024* (2013.01); *H01S 3/1666* (2013.01)

(58) Field of Classification Search
CPC ........ G01J 5/601; G01J 3/4412; G01J 5/0014; H01S 3/10007; H01S 3/1024; H01S 3/1666
See application file for complete search history.

(56) References Cited

U.S. PATENT DOCUMENTS

| | | | | |
|---|---|---|---|---|
| 4,941,753 A * | 7/1990 | Wickramasinghe | ... B82Y 35/00 250/307 |
| 5,377,219 A | 12/1994 | Geiger | |
| 6,608,677 B1 | 8/2003 | Ray | |
| 6,927,636 B2 * | 8/2005 | Deng | ........................ H01S 1/06 331/3 |
| 7,023,545 B2 | 4/2006 | Slater | |
| 7,106,436 B1 * | 9/2006 | Gord | ........................ G01J 3/44 356/301 |

(Continued)

OTHER PUBLICATIONS

S. Roy et al. (Broadband coherent anti-Stokes Raman scattering spectroscopy of nitrogen using a picosecond rnodeless dye laser; Optics Letters/ vol. 30, No. 23 / Dec. 1, 2005).

(Continued)

*Primary Examiner* — Nathaniel T Woodward
*Assistant Examiner* — Philip L Cotey
(74) *Attorney, Agent, or Firm* — AFMCLO/JAZ; Timothy M. Barlow

(57) ABSTRACT

Systems and methods for measuring temperature in an environment by creating a first beam having an energy of about 50 mJ/pulse, and a pulse duration of about 100 ps. A second beam is also created, having an energy of about 2.3 mJ/pulse, and a pulse duration of about 58 ps. The first beam and the second beam are directed into a probe region, thereby expressing an optical output. Properties of the optical output are measured at a sampling rate of at least about 100 kHz, and temperature measurements are derived from the measured properties of the optical output. Such systems and methods can be used to measure temperature in environments exhibiting highly turbulent and transient flow dynamics.

18 Claims, 4 Drawing Sheets

Laser 12
13
14
56
17
16
a b c
OPG 18
OPA 20
22
56
60
24
56
26
60
28
a
b
c
54
19
50
52
40
38
36
58
32
30
34
10
42
a
b
Spec. 46
CCD 48
Analysis 62

(56) References Cited

U.S. PATENT DOCUMENTS 7,812,311 B2 * 10/2010 DeCamp ................ G01J 3/433 250/339.07
8,338,858 B1 * 12/2012 Bastiaans .............. G01N 21/65 257/186
8,633,437 B2 1/2014 Dantus
9,318,628 B2 * 4/2016 Guyot-Sionnest .......................... H01L 31/1828
2004/0042006 A1 3/2004 Chen
2005/0058165 A1 3/2005 Morehead
2005/0062552 A1 * 3/2005 Deng ...................... G04F 5/145 331/94.1
2005/0224460 A1 10/2005 Hutson
2006/0078011 A1 4/2006 Lucht
2007/0152154 A1 * 7/2007 DeCamp ................ G01J 3/457 250/339.07
2009/0074023 A1 3/2009 Wadsworth
2009/0212769 A1 * 8/2009 Stoica ................ G01R 33/1284 324/244.1
2011/0013264 A1 1/2011 Mu
2014/0050234 A1 2/2014 Ter-mikirtchev
2014/0064324 A1 * 3/2014 Kasianowicz ......... G01N 25/00 374/45
2014/0299772 A1 * 10/2014 Guyot-Sionnest .......................... H01L 31/0272 250/338.4
2015/0104344 A1 * 4/2015 Webster ............... B23K 26/361 419/1
2016/0020575 A1 1/2016 Choi
2016/0178439 A1 * 6/2016 Freudiger .......... G01N 15/1434 356/301
2020/0025677 A1 * 1/2020 Prater ................ G01N 21/6458

OTHER PUBLICATIONS http://siamois.obspm.fr/SIAMOIS/DU440_ 12.pdf.

"Gas-phase single-shot thermometry at 1 kHz using fs-CARS spectroscopy," Roy et al., Dec. 15, 2009 / vol. 34, No. 24 / Optics Letters pp. 3857-3859.

"Chirped probe pulse femtosecond coherent anti-Stokes Raman scattering thermometry at 5 kHz in a Gas Turbine Model Combustor," Dennis et al., Proceedings of the Combustion Institute 35 (2015), pp. 3731-3738.

"High dynamic range thermometry at 5kHz in hydrogen—air diffusion flame using chirpedprobe-pulse femtosecond coherent anti-stokes Raman scattering," Dennis et al., J. Raman Spectrosc. 2016, pp. 47, 177-188.

"100-ps-pulse-duration, 100-J burst-mode laser for kHz-MHz flow diagnostics," Roy et al., Optics Letters / vol. 39, No. 22 / Nov. 15, 2014, pp. 6462-6465.

"100-kHz-Rate Gas-Phase Thermometry using 100-ps. Pulses from a Burst-Mode Laser," Roy et al., vol. 40 No. 21, Nov. 1, 2015, Optics Letters, pp. 5125-5128.

"Recent advances in coherent anti-Stokes Raman scattering spectroscopy: Fundamental developments and applications in reacting flows," Roy et al., Progress in Energy and Combustion Science 36 (2010), pp. 280-306.

* cited by examiner

SYSTEMS AND METHODS FOR HIGH-SPEED, SPECTROSCOPIC, GAS-PHASE THERMOMETRY

GOVERNMENT INTEREST

The invention described herein may be manufactured, used, and licensed by or for the Government of the United States for all governmental purposes without the payment of any royalty.

PRIORITY CLAIM

This application claims rights and priority on prior U.S. provisional patent application Ser. No. 62/404,397 filed 5 Oct. 2016, and non-provisional patent application Ser. No. 15/582,792 filed 1 May 2017, the entireties of which are incorporated herein by reference.

FIELD OF THE INVENTION

This invention relates to the field of temperature measurement. More particularly, this invention relates to coherent anti-Stokes Raman scattering (CARS) thermometry.

BACKGROUND OF THE INVENTION

CARS spectroscopy has proven to be a valuable tool for measuring temperature and major species concentrations in gas-phase reacting flows. CARS is a nonlinear diagnostic technique that relies on inducing Raman coherence in the target molecule(s) using two lasers. When this coherence is probed by a third laser, a coherent laser-like signal is generated in the phase-matching direction at a shifted frequency. This shifted signal is analyzed to achieve measurements of gas-phase temperature and species concentrations in reacting flows.

Over the last four decades, coherent anti-Stokes Raman scattering (CARS) spectroscopy has been widely used for thermometric and species-concentration measurements in gas-phase reacting and non-reacting flows. The spatio-temporally resolved nature of this approach, coupled with the coherent laser-like signal, allows for virtual time-freezing of the measured flow, thereby providing a near-instantaneous and highly accurate snapshot of the local temperature.

Until recently, gas-phase CARS-based temperature measurements were generally performed at rates of from about ten hertz to about twenty hertz. Other techniques have increased the measurements by more than two orders of magnitude to about five kilohertz, thereby enabling temporally-correlated, spatially-resolved measurements in moderately turbulent reacting flows with moderate Reynolds numbers (Re).

However, these measurement rates are not fast enough to investigate applications that exhibit highly turbulent and transient flow dynamics. Such applications include (1) high-Reynolds-number subsonic flows, (2) high-enthalpy hypervelocity environments in hypersonic propulsion, (3) high-speed transient thermometry for studying boundary-layer instability, (4) internal energy-exchange processes of interacting fluids, (5) shock-wave/boundary-layer interactions in high-speed flows, (6) explosion dynamics, and (7) flow dynamics of rocket propulsion.

For example, in high-enthalpy hypervelocity environments (application (2) above), measurements would preferably be performed at rates of about one-hundred kilohertz to about five megahertz (or from about twenty to about one thousand times faster than other techniques can provide).

What is needed, therefore, is a system that tends to address issues such as those described above, at least in part.

BRIEF SUMMARY OF THE INVENTION

The above and other needs are met by the systems and methods for measuring temperature as described herein. According to one embodiment, a method for measuring temperature is provided by creating a first beam having an energy of about 50 mJ/pulse, e.g. 50-200 mJ/pulse, and a pulse duration of about 100 ps, e.g. 50-200 ps. A second beam is also created, having an energy of about 2.3 mJ/pulse, e.g. 2-7 mJ/pulse, and a pulse duration of about 58 ps, e.g. 55-100 ps. The first beam and the second beam are directed into a probe region within an environment, thereby expressing an optical output from the environment. Properties of the optical output are measured at a sampling rate of at least about 100 kHz, e.g. 100-500 kHz, and temperature measurements are derived from the measured properties of the optical output.

Various embodiments of the current invention extend the measurement rate of state-of-the-art CARS-based thermometry by at least about twenty times by using a burst-mode laser architecture having a burst duration of from about one millisecond to about ten milliseconds and a characteristic pulse width of about 100 ps. The short duration pulse train of the burst mode laser is ideal for facilities where temporally correlated measurements must be performed within a very limited time window.

The developed technique and system allow for the enhancement of data-acquisition rate (kHz-MHz CARS), enable investigation of systems that exhibit highly turbulent and transient flow dynamics, and provide valuable data for model validation related to high-Reynolds-number subsonic flows, high-enthalpy hypervelocity environments for hypersonic-propulsion research, high-speed transient thermometry for studying boundary-layer instability and the internal energy-exchange processes of interacting fluids, shockwave/boundary-layer interactions in high-speed flows, explosion dynamics, and flow dynamics related to rocket propulsion.

In various embodiments according to this aspect of the invention, the first beam has a wavelength of about 532 nm, e.g. 532 nm+/−1.0 nm. In some embodiments, the second beam has a wavelength of about 680 nm, e.g. 680 nm+/−1.0 nm. In some embodiments, the first beam and the second beam have burst durations of at least about 1 ms, e.g. 1-10 ms. In some embodiments, the second beam is created by directing a portion of the first beam into an OPG/OPA. Some embodiments include an OPG/OPA of type-I beta-barium-borate crystals that are cut at an angle of about 21° (i.e. 21°+/−0.1°) to an optical axis, with a crystal length of about 10 mm, e.g. 10-15 mm, and about an 8-10 $mm^2$ cross section. In some embodiments, the first laser is created by a Nd:YAG-based picosecond burst-mode laser. In some embodiments, the properties of the optical output are measured with a spectrometer. In some embodiments, the measurements are recorded with an electron multiplying charge coupled device camera. In some embodiments, the optical output is passed through a bandpass filter prior to the step of measuring the properties of the optical output. In some embodiments, the first beam is a combined pump and probe beam. In some embodiments, the second beam is a Stokes beam.

According to another aspect of the invention there is described a coherent anti-Stokes Raman scattering spectography system, having a Nd:YAG-based picosecond burst-mode laser for producing a combination pump and probe beam having a wavelength of about 532+/−1.0 nm, an energy of about 50-200 mJ/pulse, e.g. 50 mJ/pulse, and a pulse duration of 50-200 ps, e.g. about 100 ps. An OPG/OPA formed of type-I beta-barium-borate crystals that are cut at an angle of 21°+/−0.1° to an optical axis, with a crystal length of 10-15 mm, e.g. about 10 mm, and an 8-10 $mm^2$ cross section, receives a portion of the combination pump and probe beam and thereby produces a Stokes beam having a wavelength of 680+/−1.0 nm, an energy of 2-7 mJ/pulse, e.g. about 2.3 mJ/pulse, a bandwidth of 150-250 $cm^{-1}$, e.g. about 200 $cm^{-1}$, and a pulse duration of 55-120 ps, e.g. about 58 ps. Optics direct the probe beam and the Stokes beam into a common probe region within an environment for a duration of 1-10 ms, e.g. about 1 ms, thereby expressing an optical output from the environment. A spectrometer receives the optical output and produces a spectrum.

A number of operational parameters have been presented as ranges of values as well as specific values within the defined ranges. The operation of the spectrography system described herein is fully operational within the defined ranges, as well as any subset of the defined ranges.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION OF THE INVENTION

Embodiments of the present invention enable coherent anti-Stokes Raman scattering (CARS) spectroscopy to be performed at kilohertz (kHz) rates through megahertz (MHz) rates, such as above about 100 kHz. CARS spectroscopy at these rates makes possible temperature measurements in environments exhibiting highly turbulent and transient flow dynamics, such as may be present in an environment, such as a combusting environment, for example. Typical CARS temperature accuracy is about plus or minus two percent.

Operational Overview

Generalized embodiments of the present invention can include (1) a burst-mode laser, (2) a broadband laser, and (3) a high-speed spectrally resolved CARS-signal detection system. In some embodiments, an OPG/OPA is implemented as the broadband laser, because of general limitations in the current state of alternate technologies.

Figure 1:
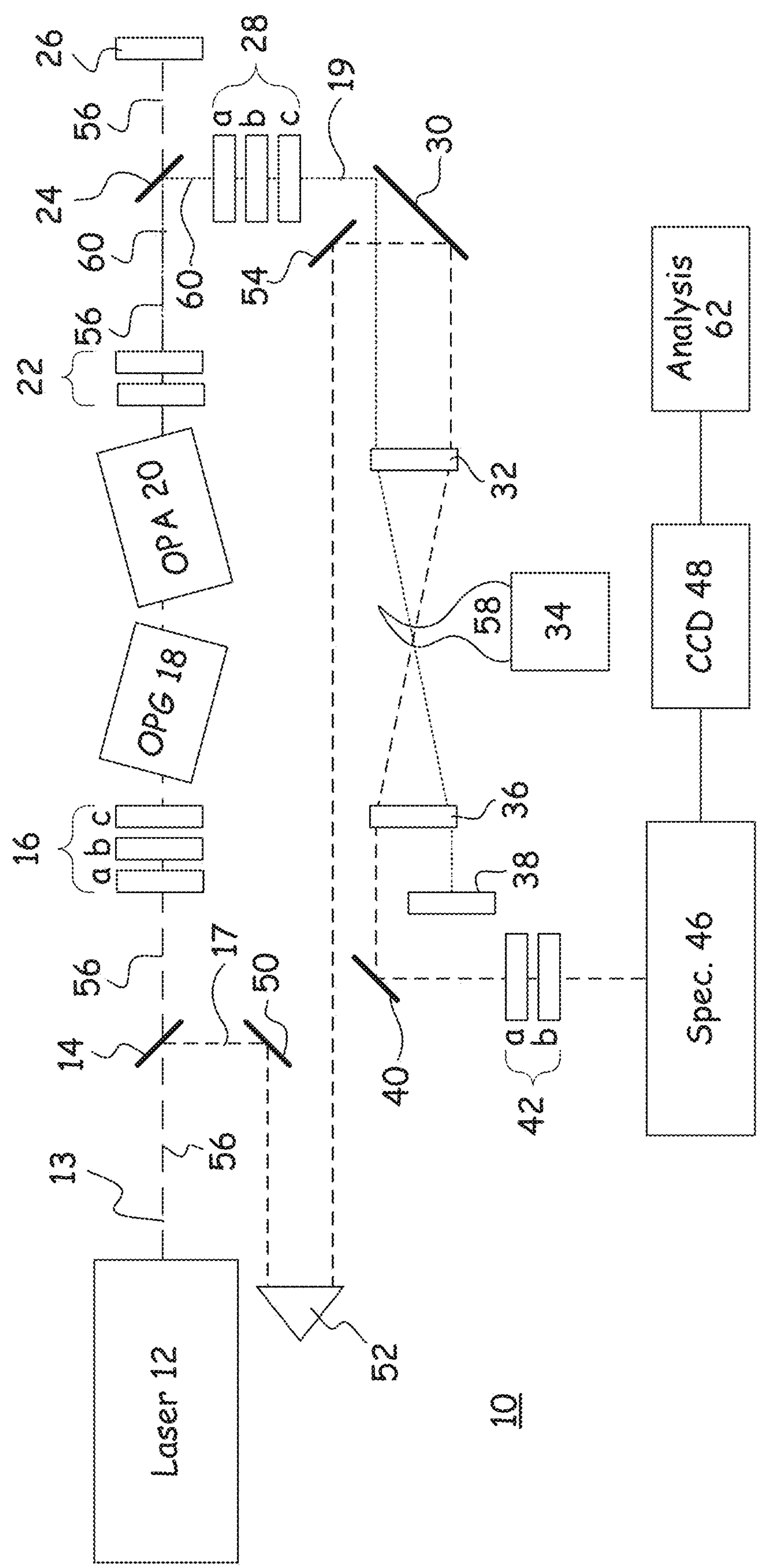
FIG. 1 is a functional block diagram of a CARS system, according to an embodiment of the present invention.
Figure 2A:
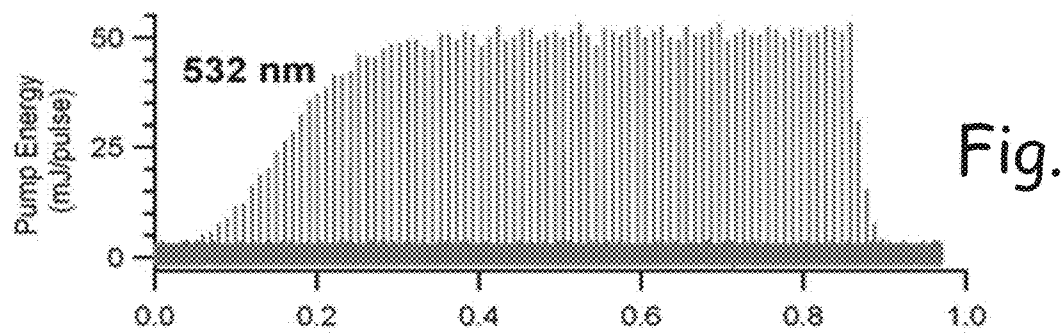
FIG. 2A is graph of a burst profile for a pump beam with a one millisecond duration, a frequency of 100 kilohertz, and a wavelength of 532 nanometers, according to an embodiment of the present invention.
Figure 2B:
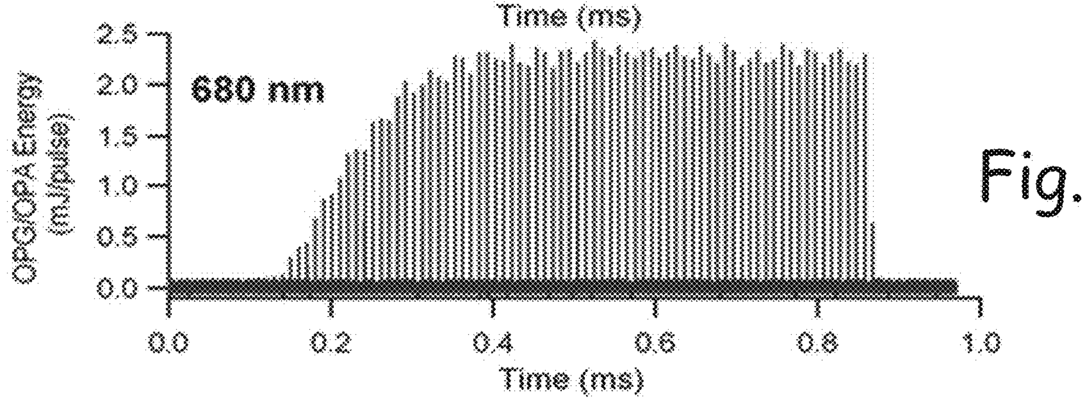
FIG. 2B is a graph of a burst profile for a probe beam that corresponds to the output of an OPG/OPA with a wavelength of 680 nanometers, according to an embodiment of the present invention.
Figure 2C:
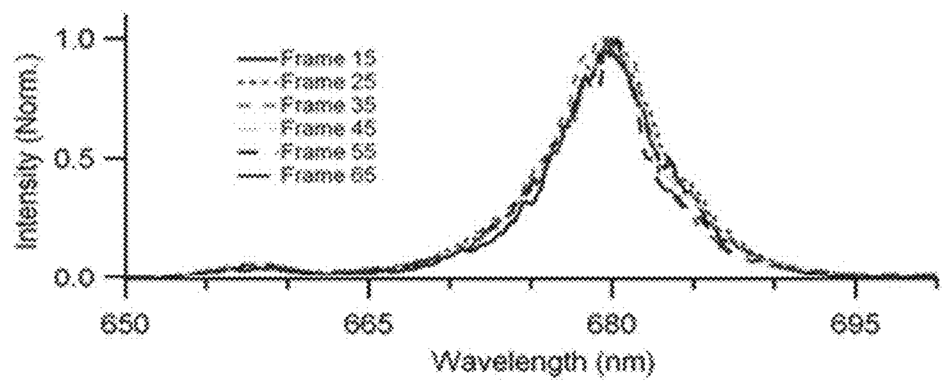
FIG. 2C is a graph of the OPG/OPA beam spectra at 100 kilohertz, showing every tenth spectrum, according to an embodiment of the present invention.
Figure 2D:
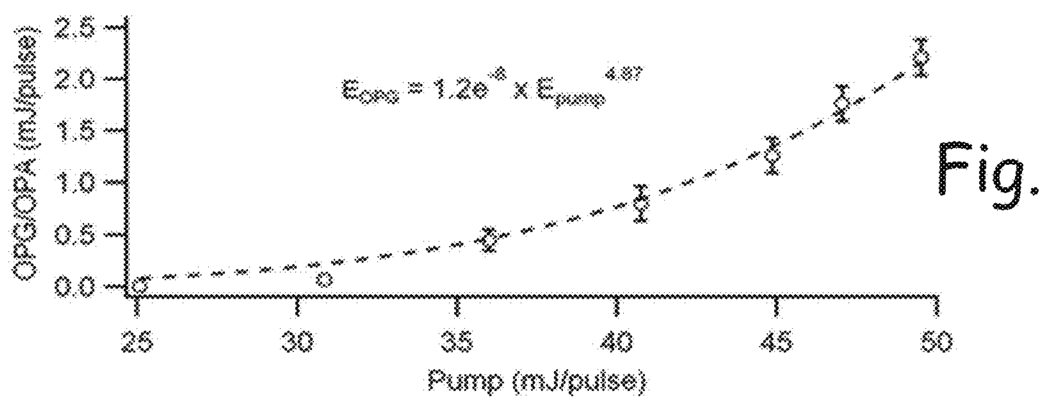
FIG. 2D is a graph of the OPG/OPA output energy as a function of pump-pulse energy, according to an embodiment of the present invention.

With reference now to FIG. 1, there is depicted a CARS spectroscopy system 10 according an embodiment of the present invention. The system includes a burst-mode laser 12 for producing a beam 56 directed along a first path 13, defined as the path between the burst mode laser 12 and the beam dump 26. Burst-mode laser 12 is, in some embodiments, a high-energy, high-repetition-rate picosecond burst-mode laser, such as a Nd:YAG-based laser, that in some embodiments produces a generally green laser beam 56 with a diameter of about 6 mm and having an energy of about 50 mJ/pulse and a wavelength of about 532 nm. Beam 56 is, in some embodiments, nearly transform-limited with a full-width at half-maximum (FWHM) pulse duration of about 100 picoseconds (ps) and a measured linewidth of about 0.2 $cm^{-1}$.

The beam 56 encounters a beam splitter 14, which passes a portion of the beam 56 along the first path 13, and diverts another portion of the beam 56 along a second path 17, which is defined between the beam splitter 14 and the spectrometer 46. The portion of the beam 56 that is diverted along the second path 17 is, in some embodiments, used as a probe beam 56. The portion of the beam 56 that is passed through the beam splitter 14 is, in some embodiments, used to produce a Stokes beam 60, all as described in more detail hereafter.

The portion of the beam 56 that is passed by the beam splitter 14 continues along the first path 13 through conditioning optics 16, such as a half-wave plate 16*a*, a concave lens 16*b*, and convex lens 16*c* that in some embodiments reduce the beam 56 from about a 6 mm diameter to about a 3 mm diameter. The reduced and conditioned beam 56 then passes through a solid-state, broadband, wavelength-tunable device, which in some embodiments is an optical parametric generator/optical parametric amplifier (OPG/OPA) 18/20, which produces as an output the Stokes beam 60, which also passes along a portion of the first path 13.

Some embodiments of the OPG/OPA 18/20 use type-I beta-barium-borate (BBO) crystals that are cut at an angle of about 21° to the optical axis. In some embodiments the crystal length is about ten millimeters, with about an 8-$mm^2$ cross section.

In the embodiment depicted, the burst-mode laser 12 produces high-energy, transform-limited picosecond laser pulses 56 at a repetition rate of about 100 kHz or higher, providing sufficient picosecond pulse energy to pump the OPG/OPA 18/20, and generate a high-energy broadband Stokes laser beam 60.

In some embodiments, the Stokes beam 60 is a generally red beam with a wavelength of about 680 nm, a FWHM bandwidth of about 8 nm, a pulse duration of about 58 ps, a bandwidth of about 200 $cm^{-1}$, and a pulse energy of about 2.3 mJ.

In the illustrated embodiment, the Stokes beam 60 and residual portions of the beam 56 exit the OPG/OPA 18/20 and pass along the first path 13 through additional conditioning optics 22, before encountering another beam splitter 24. The beam splitter 24, in some embodiments, allows the residual portions of the beam 56 to pass through along the first path 13 to a beam dump 26. The beam splitter 24 diverts the Stokes beam 60 along a third path 19, and through another set of conditioning optics 28, such as a lens 28*a*, bandpass filter 28*b*, and half wave plate 28*c*. After passing through the conditioning optics 28, the Stokes beam 60 is folded by a mirror 30 to continue along the third path 19.

Returning now to the probe beam 56 that was diverted by the beam splitter 14 along the second path 17, it is delivered along the second path 17 to the folding mirror 30. However, the second path 17 between the beam splitter 14 and the mirror 30 includes some delay elements, such as might include a longer path length, using mirrors 50 and 54, and prism 52, such that it leaves mirror 30 in phase with the Stokes beam 60, which was delayed by the OPG/OPA 18/20.

Some characteristics of the Stokes beam 60 are depicted in FIG. 2. Typical burst profiles showing individual pulse energy for the pump beam 56 (about 532 nm) and the corresponding Stokes beam 60 (in this case, a Stokes beam having a wavelength of about 680 nm) over about a one millisecond burst duration with a frequency of about 100-kHz are displayed in FIGS. 2A and 2B, respectively. The pulse-to-pulse standard deviation across the burst (after reaching a plateau) is about 4% and about 6% for the pump beam 56 and the Stokes beam 60, respectively. The dynamic spectral profile for the Stokes beam 60 for a few pulses is displayed in FIG. 2C. The recorded pulse-to-pulse variation of the spectral width is about 5%. The dependence of the pulse energy of the Stokes beam 60 on the pulse energy of the pump beam 56 is depicted in FIG. 2D.

From a power-law fit it is observed that the intensity of the Stokes beam 60 is proportional to the pulse energy of the pump beam 56 raised to the power of about 4.87. In some embodiments the maximum parametric down-conversion efficiency reaches about 5%. The conversion efficiency is limited in some embodiments by the threshold of about 1.8 $GW/cm^2$ at which the coating of the OPG/OPA 18/20 is damaged. For burst durations that are longer than about one millisecond, a small deterioration of efficiency is observed in some embodiments, which might be attributed to heating of the OPG/OPA 18/20 and the resulting change of the phase-matching conditions.

The probe beam 56 and the Stokes beam 60 are directed onto and folded by the mirror 30 in such a manner that the second path 17 and the third path 19 are axial, one to another, after leaving the mirror 30. The beams 56 and 60 then encounter, in some embodiments, a spherical lens 32 with a focal length of about 200 mm, at a relatively small incident angle of about 3°, to achieve a desirable phase-matching condition for all of the transitions covered by the bandwidth of the OPG/OPA 18/20. In some embodiments, the spherical lens 32 crosses the probe beam 56 and the Stokes beam 60 at a measurement point within a probe region 58, which is located within an environment where temperature is to be measured.

The interaction of the probe beam 56 and the Stokes beam 60 produces, in the embodiment described herein, a hydrogen CARS signal that is indicative of, among other things, the temperature at the precise point in the probe region 58 as which the probe beam 56 and the Stokes beam 60 interacted, and at the exact time that the synched pulses of the probe beam 56 and the Stokes beam 60 interacted. This CARS signal is carried along the second path 17 with the probe beam 56.

In the illustrated embodiment, probe region 58 may be a gaseous reaction region, such as a flame, emitting from a burner or engine 34, where an additional electron that is characteristic of the temperature of the flame 58 is emitted along the path of the probe beam 56. In some embodiments, the probe beam 56 (including the CARS signal) and the Stokes beam 60 are conditioned by lens 36 such that the second path 17 and the third path 19 are once again axial, one to another.

The Stokes beam 60 is then absorbed by a beam dump 38, in some embodiments, and the probe beam 56 (with the CARS signal) is directed by mirror 40 through conditioning optics 42, which in some embodiments include a focusing lens 42*b* to focus the combined components of beam 56 into the spectrometer 46. Conditioning optics 42 in some embodiments include an 8 nm bandpass filter 42*b* centered at about 439 nm (such as Semrock, LD01-439/8-25.4), to minimize signal interference from flame emission and laser scatter.

The probe beam 56 and resulting hydrogen CARS signal is accepted by a high-speed spectrally resolved CARS-signal detection system 46, such as a 0.25-m spectrometer 46 that is equipped with a 2,400 groove/mm grating. The output of the spectrometer 46 is observed by a recording device 48, such as a high-speed EMCCD camera 48 (such as a Princeton Instruments ProEM-HS 1024BX3) with a 1024×1024 pixel array, which is used in some embodiments for the acquisition of the CARS spectra at a rate of about 100-kHz, and is phase-locked to be synchronized with the laser 12. In this embodiment, the camera 48 chip is illuminated over about 10 pixels (which is equivalent to a frame-shifting time of about 8 microseconds) to achieve the signal-acquisition speed of about 100 kHz. The camera 48 chip size is about 13×13 microns. This high-speed EMCCD camera 48 can operate at up to about 333 kHz. For data-acquisition speeds greater than 333 kHz, the camera 48 could be replaced with a FASTCAM SA-Z (from Photron).

The output of the recording device 48 is input to an analyzer 62, where the CARS signal is analyzed to determine properties of the environment 58, such as temperature, according to known principles. The CARS signal is temperature dependent. The strength of the signal scales non-linearly with the difference in the ground state population and the vibrationally excited state population. Since the population of these states follows the temperature-dependent Boltzmann Distribution, the CARS signal carries an intrinsic temperature dependence as well.

In actual tests, single-laser-shot temperature measurements were performed in highly turbulent hydrogen/nitrogen jet-diffusion flames 58 at rates of 100 kHz. The Reynolds number for the jet flame 58, based on a diameter of about 9.5 mm for the jet flame 58, was about 10,000. The measurements were made at a distance of about 50 mm from the jet 34 exit. Information in regard to the measurements is discussed below, with reference to FIGS. 3 and 4.

Figure 3A:
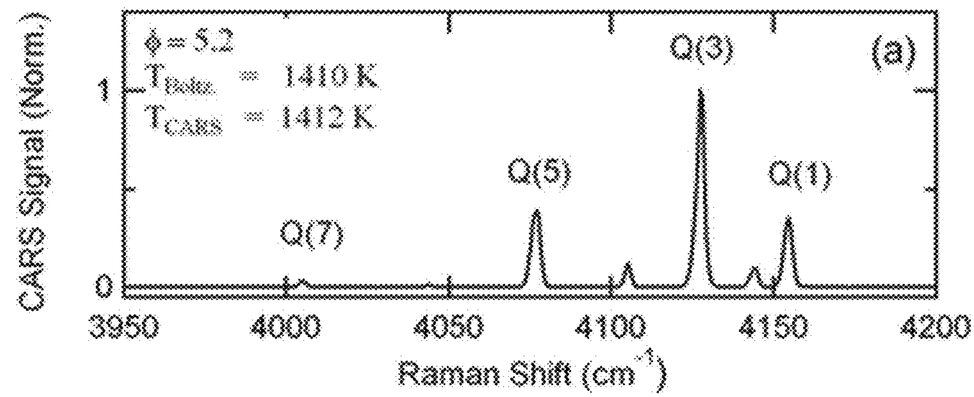
FIG. 3A is a graph of a single-shot picosecond-CARS hydrogen spectrum recorded in an hydrogen/air flame that is stabilized over a Hencken burner at q=5.2, according to an embodiment of the present invention.

Measurements were initially performed in an atmospheric-pressure, nearly adiabatic hydrogen/air flame 58 that was stabilized over a Hencken burner 34. The burner 34 was operated at high flow rates to minimize heat losses to the burner 34. The energies used for pump 56 and Stokes 60 pulses were about 2 mJ/pulse and about 2.3 mJ/pulse, respectively. FIG. 3A displays a single-shot spectrum for hydrogen at an equivalence ratio (ϕ) of 5.2. The Q-branch transitions of the v'=1→v"=0 vibrational band of hydrogen are shown in FIG. 3A. The extracted temperature $T_{CARS}$=1410 K agrees well with the adiabatic flame temperature $T_{adiab}$=1412 K.

Figure 3B:
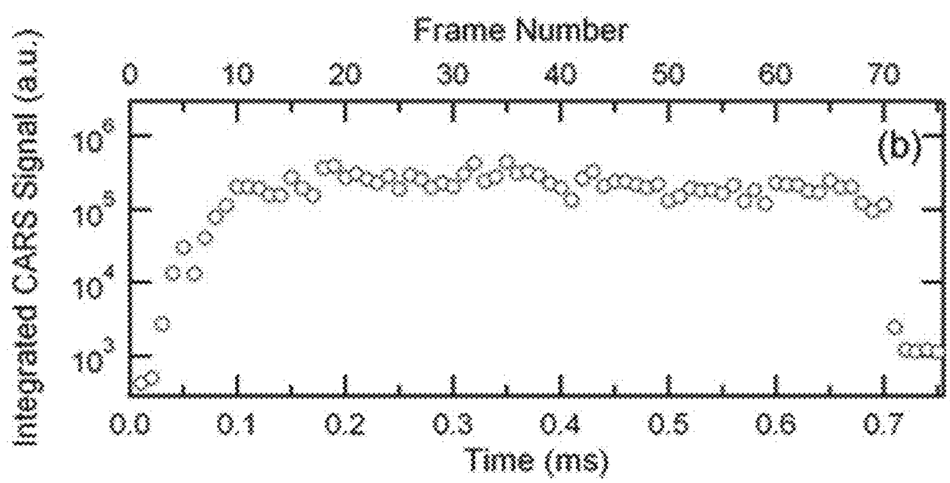
FIG. 3B is a graph of an integrated, single-shot, picosecond-CARS hydrogen signal as a function of time, according to an embodiment of the present invention.
Figure 3C:
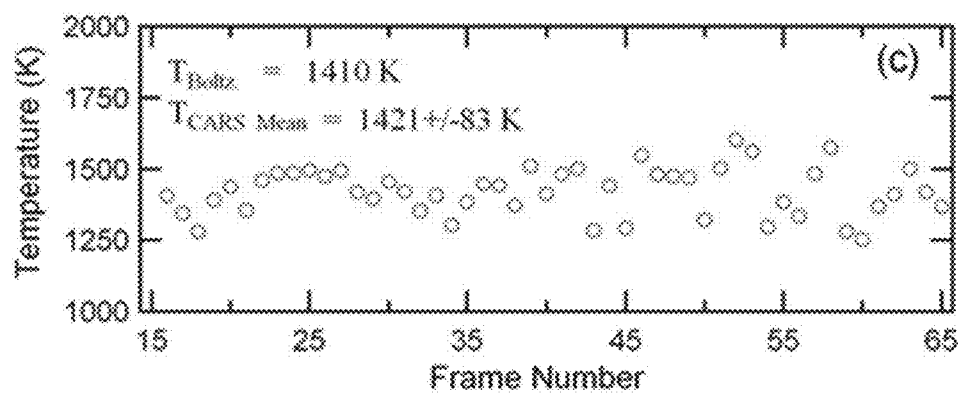
FIG. 3C is a graph of a corresponding temperature for fifty consecutive laser shots, according to an embodiment of the present invention.

FIG. 3B displays typical integrated CARS signal as a function of time. The CARS signal becomes stable after the sixteenth pulse of the pulse train, and this signal level is maintained from Frame 15 to Frame 65 (50 measurement data points, which is equivalent to a measurement time of 0.5 ms). The corresponding temperature acquired from each single-shot spectrum is shown in FIG. 3C.

Figure 4A:
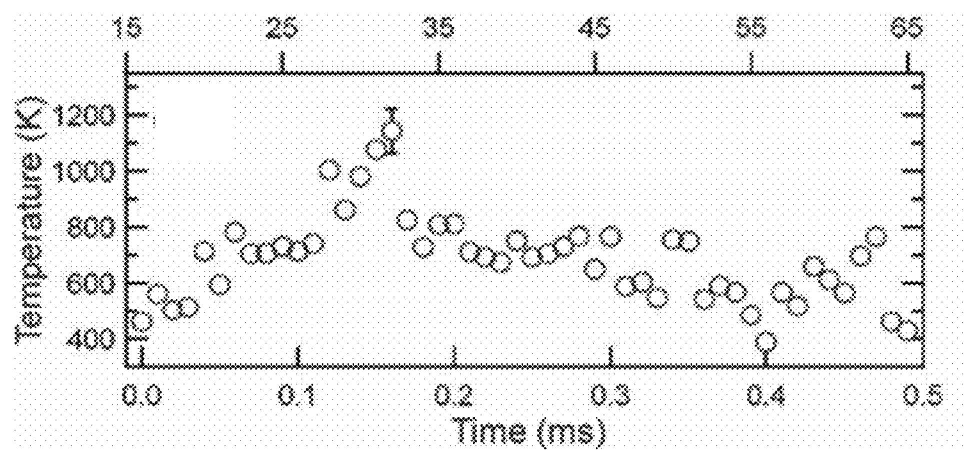
FIG. 4A is a graph of temperatures that have been extracted from a spectrograph of fifty consecutive single-shot, picosecond-CARS hydrogen spectra taken at 100 kilohertz from a turbulent flame, according to an embodiment of the invention.
Figure 4B:
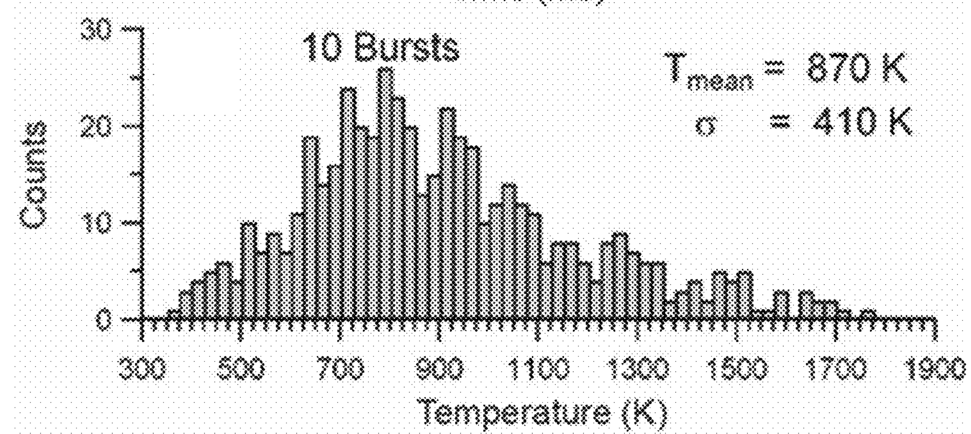
FIG. 4B is a graph of temperature probability density functions (PDFs) for ten bursts (a total of 500 laser shots), according to an embodiment of the invention.

Depicted in FIG. 4A are temperature values derived from the hydrogen picosecond-CARS signal that was obtained in the turbulent flame during a one millisecond burst. A rapid temperature change in the turbulent flame can be observed. Probability-density functions (PDFs) of temperature derived from 500 single-shot spectra collected from ten bursts are depicted in FIG. 4B. The obtained mean temperature and standard deviation of the single-shot thermometry in turbulent flames 58 were 870 K and 410 K, respectively. The jet flame 58 has a very wide temperature distribution because of turbulent mixing of the fuel (hydrogen) and the oxidizer (ambient air).

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for measuring gas phase temperature in an environment, the method comprising:

creating a first beam having an energy of 50-200 mJ/pulse, and a pulse duration of 50-200 ps;

creating a second beam having an energy of 2.3-2.7 mJ/pulse, and a pulse duration of 55-100 ps;

directing the first beam and the second beam into a probe region within the environment, thereby expressing an optical output from the environment;

channeling the optical output through an 8 nm bandpass filter centered at 439 nm prior to measuring the properties of the optical output;

measuring properties of the optical output at a sampling rate of at least 100-500 kHz; and deriving the temperature from the measured properties of the optical output.

2. The method of claim 1, wherein the first beam has a wavelength of 532+/−1 nm.

3. The method of claim 1, wherein the second beam has a wavelength of 680+/−1 nm.

4. The method of claim 1, further comprising channeling the optical output through a bandpass filter prior to measuring the properties of the optical output.

5. The method of claim 1, wherein the first beam and the second beam are created for a burst duration of at least 1-10 ms and a repetition rate of at least 100 kHz.

6. The method of claim 1, wherein the second beam is created by directing a portion of the first beam into an optical parametric generator/optical parametric amplifier (OPG/OPA).

7. The method of claim 1, wherein the second beam is created by directing a portion of the first beam into an optical parametric generator/optical parametric amplifier (OPG/OPA) of type-I beta-barium-borate crystals that are cut at an angle of about 21°+/−1° to an optical axis, with a crystal length of 10-15 mm, and an 8-10 $mm^2$ cross section.

8. The method of claim 1, wherein the first beam is created by a picosecond burst-mode laser.

9. The method of claim 1, wherein the properties of the optical output are measured with a spectrometer.

10. The method of claim 1, further comprising recording measurements with an electron multiplying charge coupled device camera.

11. The method of claim 1, wherein the first beam is configured to be a combined pump and probe beam, the second beam is configured to be a Stokes beam, and the second beam is derived from the first beam.

12. The method of claim 1, wherein the second beam is a Stokes beam.

13. A method for measuring temperature in an environment, the method comprising:

creating a first beam with a picosecond burst-mode laser, the first beam having a wavelength of 532+/−1 nm, an energy of 50-200 mJ/pulse, and a pulse duration of 50-200 ps;

directing a portion of the first beam into an optical parametric generator/optical parametric amplifier (OPG/OPA), thereby creating a second beam having a wavelength of 680+/−1 nm, an energy of 2.3-2.7 mJ/pulse, a bandwidth of 150-250 $cm^{-1}$, and a pulse duration of 55-100 ps;

directing the first beam and the second beam into a probe region within the environment for a pre-determined duration, thereby expressing an optical output from the environment;

channeling the optical output through an 8 nm bandpass filter centered at 439 nm prior to measuring the properties of the optical output;

measuring properties of the optical output at a sampling rate of at least 100 kHz; and deriving the temperature of the environment from the measured properties of the optical output.

14. The method of claim 13, wherein the OPG/OPA is formed of type-I beta-barium-borate crystals that are cut at an angle of 21°+/−1° to an optical axis, with a crystal length of 10-15 mm, and an 8-10 $mm^2$ cross section.

15. The method of claim 13, wherein the properties of the optical output are measured with a spectrometer.

16. The method of claim 13, further comprising recording measurements with an electron multiplying charge coupled device camera.

17. The method of claim 13, wherein the first beam is a combined pump and probe beam.

18. The method of claim 13, wherein the second beam is a Stokes beam.

* * * * *